United States Patent
Mogi et al.

(10) Patent No.: US 12,063,332 B2
(45) Date of Patent: Aug. 13, 2024

(54) IDENTIFICATION APPARATUS AND IMAGE FORMING APPARATUS

(71) Applicant: CANON KABUSHIKI KAISHA, Tokyo (JP)

(72) Inventors: Keisuke Mogi, Chiba (JP); Yuma Inui, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 4 days.

(21) Appl. No.: 18/161,727

(22) Filed: Jan. 30, 2023

(65) Prior Publication Data
US 2023/0254424 A1   Aug. 10, 2023

(30) Foreign Application Priority Data

Feb. 9, 2022 (JP) ................... 2022-018465

(51) Int. Cl.
*H04N 1/00* (2006.01)
*G03G 15/00* (2006.01)

(52) U.S. Cl.
CPC ....... *H04N 1/00737* (2013.01); *G03G 15/502* (2013.01); *G03G 15/5025* (2013.01); *G03G 15/5029* (2013.01); *G03G 15/60* (2013.01); *G03G 15/607* (2013.01); *G03G 2215/00616* (2013.01); *G03G 2215/00637* (2013.01); *G03G 2215/00738* (2013.01); *G03G 2215/00742* (2013.01); *G03G 2215/00751* (2013.01)

(58) Field of Classification Search
CPC ............. G03G 15/502; G03G 15/5025; G03G 15/5029; G03G 15/60; G03G 15/607; G03G 2215/00616; G03G 2215/00637; G03G 2215/00738; G03G 2215/00742; G03G 2215/00751; H04N 1/00737
See application file for complete search history.

(56) References Cited

U.S. PATENT DOCUMENTS

| | | | |
|---|---|---|---|
| 2010/0271673 A1* | 10/2010 | Ohkawa | H04N 1/6041 358/518 |
| 2020/0218187 A1* | 7/2020 | Takahashi | G03G 15/5025 |
| 2021/0321013 A1* | 10/2021 | Ishido | H04N 1/00034 |

FOREIGN PATENT DOCUMENTS

JP   2016109425 A   6/2016

* cited by examiner

*Primary Examiner* — Joseph S Wong
(74) *Attorney, Agent, or Firm* — Canon U.S.A., Inc. I.P. Division

(57) ABSTRACT

An identification apparatus includes a guide member defining a guide path, a scanning portion that scans the sheet inserted in the guide path, a first detection portion disposed upstream of the scanning portion in an insertion direction of the sheet in the guide path that detects presence/absence of the sheet, and a second detection portion disposed downstream of the scanning portion in the insertion direction in the guide path and detects presence/absence of the sheet. The identification apparatus is configured to start measurement of a surface property of the sheet by the scanning portion in response to a change in a detection result of one of the first detection portion or the second detection portion, and complete the measurement in response to a change in a detection result whichever of the first detection portion or the second detection portion not used in determining the start of the measurement.

17 Claims, 16 Drawing Sheets

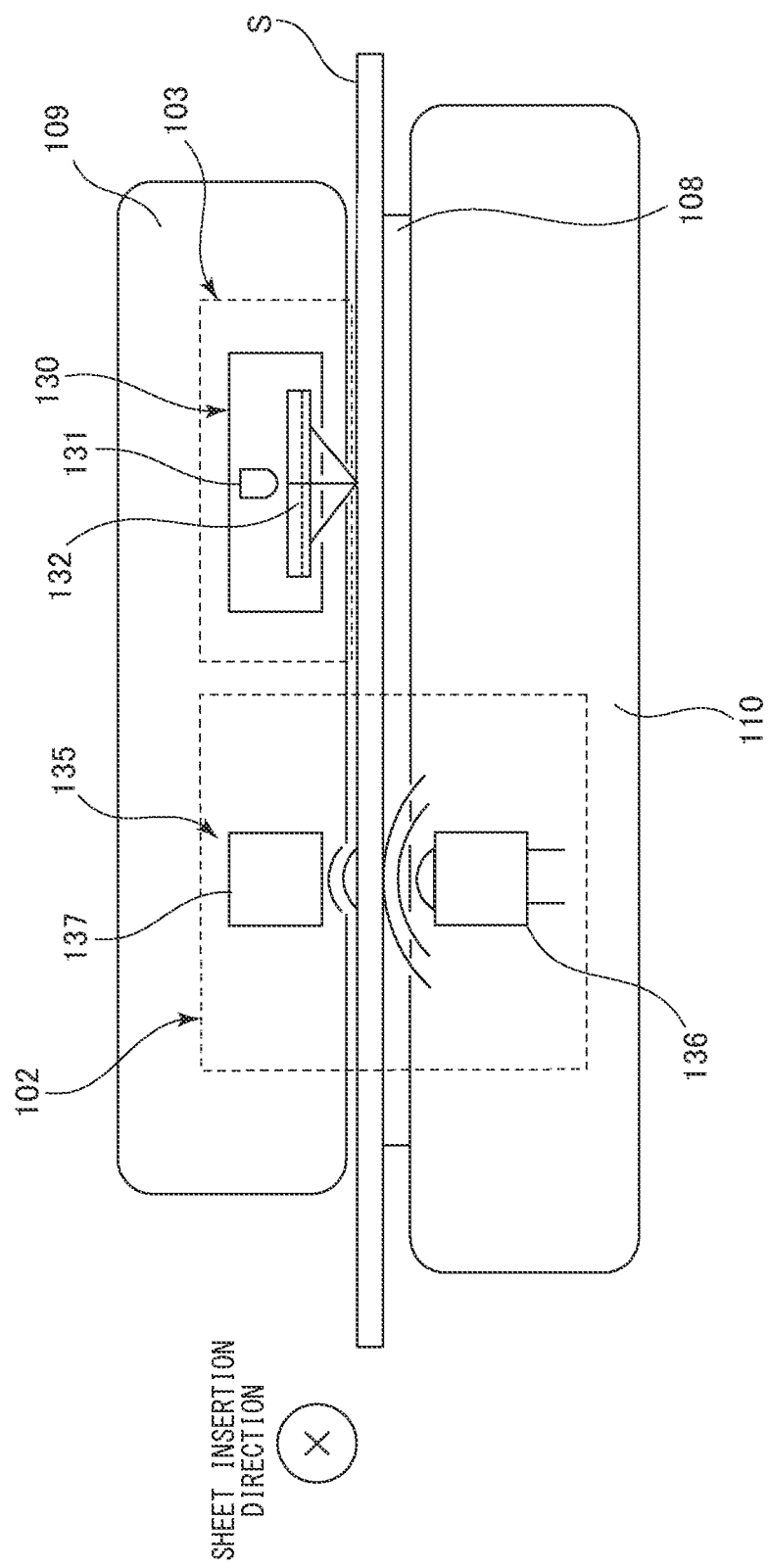

| SHEET BRAND | TYPE | GRAMMAGE [g/m^2] | COMPATIBILITY WITH APPARATUS | RESTRICTION OF GRAIN DIRECTION | FEEDABLE PORT | FIXING SPEED [mm/s] |
|---|---|---|---|---|---|---|
| THIN PAPER A | THIN PAPER | 58 | × | - | - | - |
| THIN PAPER B | THIN PAPER | 60 | ○ | NO RESTRICTION | ALL | 300 |
| HIGH-QUALITY PAPER A | PLAIN PAPER | 64 | ○ | NO RESTRICTION | ALL | 300 |
| HIGH-QUALITY PAPER B | PLAIN PAPER | 81 | ○ | NO RESTRICTION | ALL | 300 |
| HIGH-QUALITY PAPER C | PLAIN PAPER | 157 | ○ | NO RESTRICTION | ALL | 300 |
| CARDBOARD A | CARDBOARD | 250 | ○ | NO RESTRICTION | ALL | 150 |
| CARDBOARD B | CARDBOARD | 270 | ○ | ONLY SHORT GRAIN | ONLY MANUAL | 150 |
| CARDBOARD C | CARDBOARD | 300 | × | - | ONLY MANUAL | 150 |
| CARDBOARD D | CARDBOARD | 350 | ○ | NO RESTRICTION | ONLY MANUAL | 150 |
| COATED PAPER A | COATED PAPER | 104 | ○ | NO RESTRICTION | ONLY MANUAL | 150 |
| COATED PAPER B | COATED PAPER | 128 | × | - | - | - |
| SYNTHETIC SHEET A | SYNTHETIC SHEET | 128 | ... | ... | ... | ... |
| ... | ... | ... | ... | ... | ... | ... |

| SHEET BRAND NAME | GRAMMAGE [g/m^2] | ADJACENT PIXEL DIFFERENCE ACCUMULATION VALUE | BRIGHTNESS | SHEET THICKNESS [μm] | SHEET CLASS |
|---|---|---|---|---|---|
| CS-052 | 52 | 2600 | 43000 | 67 | THIN PAPER |
| ..... | ..... | ..... | ..... | ..... | ..... |
| CS-068 | 68 | 3000 | 50000 | 92 | PLAIN PAPER 1 |
| ..... | ..... | ..... | ..... | ..... | ..... |
| CS-081 | 81.4 | 2000 | 50000 | 97 | PLAIN PAPER 2 |
| ..... | ..... | ..... | ..... | ..... | ..... |
| IMAGE COAT GLOSS 128 | 128 | 1500 | 46000 | 140 | COATED PAPER 1 |
| MIRROR COAT PLATINUM 209 | 209 | 10000 | 60000 | 210 | COATED PAPER 2 |
| ..... | ..... | ..... | ..... | ..... | ..... |

IDENTIFICATION APPARATUS AND IMAGE FORMING APPARATUS

BACKGROUND

Field

The present disclosure relates to an identification apparatus that measures a surface property of a sheet and to an image forming apparatus.

Description of the Related Art

In recent years, various types of sheets have been used as sheets serving as recording materials in image forming apparatuses such as copiers, printers, facsimile machines, and multifunctional apparatuses having functions of these based on demand from users. For example, in an image forming apparatus of an electrophotographic system, optimum conditions in each step such as charging, exposure, development, transfer, or fixation vary depending on the type of the sheet. Therefore, it is desired that the type of the sheet on which image formation is to be performed is appropriately set in advance. However, for example, there is a case where the user does not know the type of the sheet, and there is a possibility that the type of the sheet cannot be correctly set in the image forming apparatus. Japanese Patent Laid-Open No. 2016-109425 proposes identifying the type of the sheet by measuring surface properties of the sheet by an optical sensor when a user inserts the sheet.

In recent years, the variety of the types of sheets being used has become more diverse due to the demand for diversity in on-demand printing, and it is desired that the measurement precision is improved also for the identification apparatus that identifies the type of the sheet as described above. However, in an identification apparatus that performs measurement of a sheet inserted by a user, for example, there is a case where the user fails to correctly insert the sheet. In such a case, for example, if the sheet does not move and the sheet is scanned by an optical sensor at the same position, the measurement data thereof is insufficient, and there is a possibility that the measurement precision becomes poor.

SUMMARY OF THE INVENTION

According to an aspect of the present disclosure, an identification apparatus includes a guide member configured to define a guide path through which a sheet inserted therein is guided, a scanning portion configured to scan the sheet inserted in the guide path, a first detection portion disposed upstream of the scanning portion in an insertion direction of the sheet in the guide path and configured to detect presence/absence of the sheet, and a second detection portion disposed downstream of the scanning portion in the insertion direction in the guide path and configured to detect presence/absence of the sheet. The identification apparatus is configured to start measurement of a surface property of the sheet by the scanning portion in response to a change in a detection result of one of the first detection portion or the second detection portion, and complete the measurement in response to a change in a detection result of whichever of the first detection portion or the second detection portion not used in determining the start of the measurement.

Further features will become apparent from the following description of exemplary embodiments with reference to the attached drawings.

BRIEF DESCRIPTION OF THE DRAWINGS

FIG. 6 is a schematic diagram illustrating the sheet type identification apparatus in the state in which the sheet according to the present embodiment is inserted as viewed in an insertion direction.

FIG. 15 is a diagram illustrating sheet type data according to the present embodiment.

FIG. 16 is a diagram illustrating sheet reference data in which a relationship between a sheet brand and a reference value of a measurement item according to the present embodiment is recorded.

DESCRIPTION OF THE EMBODIMENTS

Figure 1:
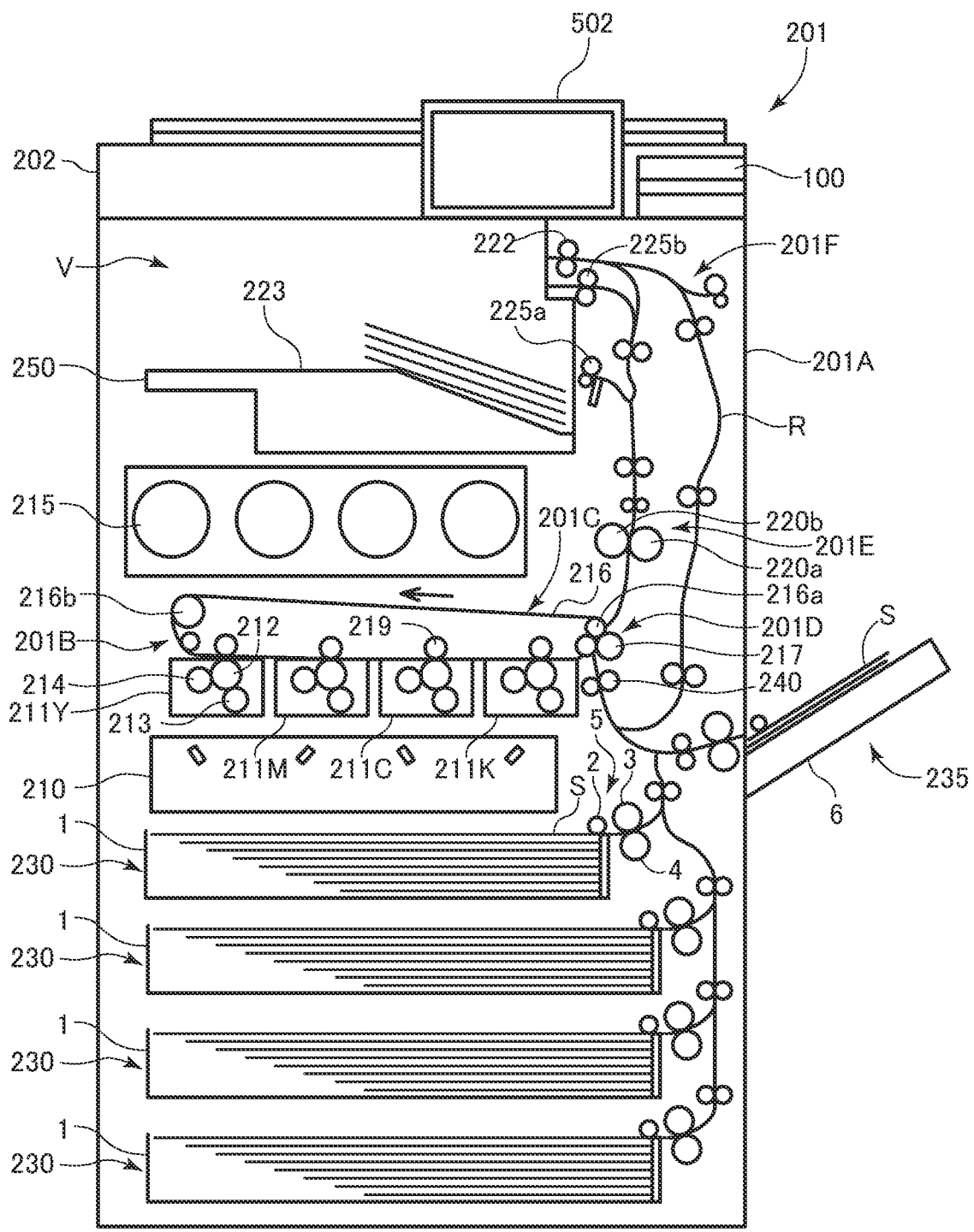
FIG. 1 is a diagram illustrating an image forming apparatus including a sheet type identification apparatus according to a present embodiment.

An embodiment of the present disclosure will be described in detail below with reference to the corresponding drawings. FIG. 1 illustrates a schematic configuration of the image forming apparatus according to an exemplary embodiment. More specifically, an image forming apparatus 201 including a sheet type identification apparatus 100 as an identification apparatus according to the present disclosure will be described with reference to FIG. 1.

Schematic Configuration of Image Forming Apparatus

As illustrated in FIG. 1, reference number 201 denotes an image forming apparatus, reference number 201A denotes an image forming apparatus body, and reference number 201B denotes an image forming portion that forms an image on a sheet. Reference number 202 denotes an image reading apparatus that is approximately horizontally disposed above the image forming apparatus body 201A, and a discharge space V for discharging sheets is provided between the image reading apparatus 202 and the image forming apparatus body 201A. An operation portion 502 serving as an operation display portion that is constituted by a touch panel or the like and capable of receiving an inputting operation and displaying a screen, and a sheet type identification apparatus 100 that will be described in detail below are provided above the image forming apparatus body 201A, that is, in an upper portion of the image forming apparatus 201.

The image forming portion 201B serving as image forming portion is a four-drum full-color system. The image forming portion 201B includes a laser scanner 210, and four process cartridges 211Y, 211M, 211C, and 211K that respectively form toner images of four colors of yellow (Y), magenta (M), cyan (C), and black (K). Each of the process cartridges 211Y, 211M, 211C, and 211K include a photosensitive drum 212, a charging unit 213 serving as a charging means, and a developing unit 214 serving as a developing portion. In addition, the image forming portion 201B includes an intermediate transfer unit 201C and a fixing portion 201E that are disposed above the process cartridges 211Y, 211M, 211C, and 211K. Reference number 215 denotes a toner cartridge for supplying toner to the developing unit 214.

The intermediate transfer unit 201C includes an intermediate transfer belt 216 looped over a driving roller 216a and a tension roller 216b. Primary transfer rollers 219 that abut the intermediate transfer belt 216 at positions respectively opposing the photosensitive drums 212 are provided on the inner peripheral side of the intermediate transfer belt 216. The intermediate transfer belt 216 is rotated in a direction indicated by an arrow by the driving roller 216a driven by driving portion (not illustrated).

The primary transfer rollers 219 sequentially transfer toner images of respective colors having a negative polarity on the photosensitive drums 212 onto the intermediate transfer belt 216 to be superimposed on each other. A secondary transfer roller 217 that transfers the color image formed on the intermediate transfer belt 216 onto the sheet S is provided at a position opposing the driving roller 216a of the intermediate transfer unit 201C. A secondary transfer portion 201D is formed between the intermediate transfer belt 216 and the secondary transfer roller 217. A fixing portion 201E including a pressurizing roller 220a and a heating roller 220b is disposed above the secondary transfer roller 217. In addition, a first discharge roller pair 225a, a second discharge roller pair 225b, and a duplex inversion portion 201F are disposed on the upper-left side of the fixing portion 201E. The duplex inversion portion 201F includes a reverse conveyance roller pair 222 capable of rotating in a normal direction and a reverse direction, a re-conveyance path R for conveying a sheet on one surface of which an image has been formed to the image forming portion 201B again, and the like.

A sheet feeding unit 230 that delivers a set sheet S to the image forming portion 201B is provided in a lower portion of the image forming apparatus body 201A. The sheet feeding unit 230 includes a feed cassette 1 serving as a sheet supporting portion that accommodates and supports the sheet S, and a sheet feeding portion 5 that feeds the sheet S accommodated in the feed cassette 1. The sheet feeding portion 5 includes a pickup roller 2, and a feed roller 3 and a retard roller 4 serving as a separation portion for separating sheets S that are simultaneously delivered by the pickup roller 2 from each other.

A manual feeding portion 235 that delivers the set sheet S to the image forming portion 201B is provided on the right side surface of the image forming apparatus body 201A in FIG. 1. The manual feeding portion 235 includes a manual feed tray 6 serving as a sheet supporting portion that supports the sheet S, and includes a sheet feeding means and a separation portion similarly to the sheet feeding unit 230

Next, an image forming operation of the image forming apparatus 201 will be described. When image information of a document is read by the image reading apparatus 202, the image information is subjected to image processing, and is then converted into an electric signal and transmitted to the laser scanner 210 of the image forming portion 201B. In the image forming portion 201B, the surfaces of the photosensitive drums 212 are each uniformly charged to a predetermined polarity and a predetermined potential by the charging unit 213 and are sequentially exposed by laser light. As a result, yellow, magenta, cyan, and black electrostatic latent images are sequentially formed on the photosensitive drums 212 of respective process cartridges 211.

These electrostatic latent images are developed and visualized with the toners of respective colors, and the toner images of respective colors on the respective photosensitive drums 212 are sequentially transferred onto the intermediate transfer belt 216 by primary transfer bias applied to the primary transfer rollers 219 to be superimposed on each other. As a result, a toner image is formed on the intermediate transfer belt 216.

The sheet S fed by the feed roller 3 of the sheet feeding unit 230 is conveyed to a registration roller pair 240 constituted by a driving roller and a driven roller (not illustrated). Driving of the registration roller pair 240 is stopped, and the leading end of the sheet S abuts the registration roller pair 240. As a result, the leading end of the sheet S is caused to follow the registration roller pair 240. The feed roller 3 continues conveying the sheet S, which results in forming of a warpage (loop) in the sheet S, and the registration roller pair 240 is driven when a predetermined loop amount is reached. As a result, the skew of the sheet S is corrected by the registration roller pair 240, and the sheet S whose skew has been corrected is conveyed to the secondary transfer portion 201D by the registration roller pair 240. Sequentially, in the secondary transfer portion 201D, the toner image is collectively transferred onto the sheet S by a secondary transfer bias applied to the secondary transfer roller 217. Then, the sheet S onto which the toner image has been transferred is conveyed to the fixing portion 201E, toner of respective colors is melted and mixed by the heat and pressure from the fixing portion 201E, and is fixed to the sheet S as a color image.

The sheet S to which the image has been fixed is discharged to the discharge space V by a first discharge roller pair 225a and a second discharge roller pair 225b provided downstream of the fixing portion 201E, and is supported on a supporting portion 223 formed on the bottom surface of the discharge space V. In the case of forming images on both surfaces of the sheet S, after the image is fixed, the sheet S is conveyed to the re-conveyance path R by the reverse conveyance roller pair 222, and is conveyed to the image forming portion 201B again.

Figure 2:
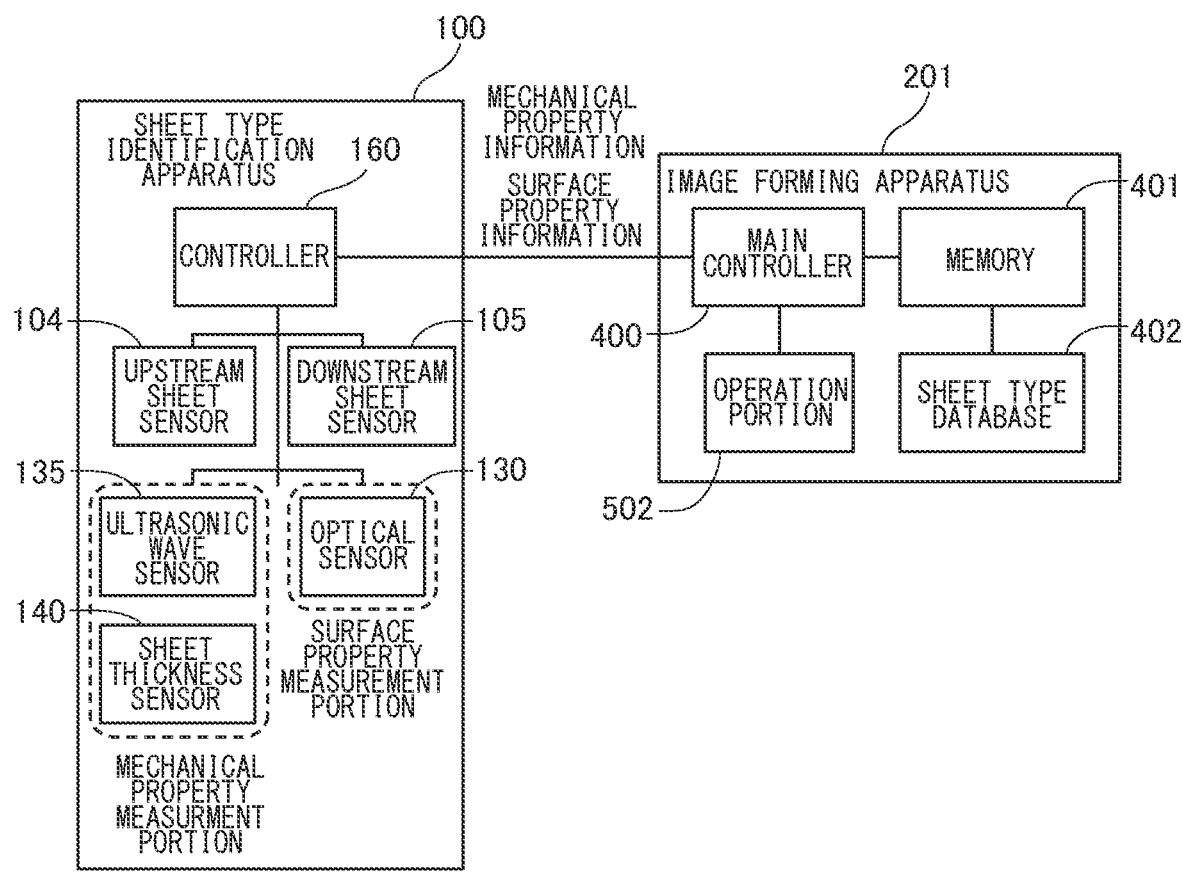
FIG. 2 is a block diagram illustrating a control system according to the present embodiment.

Control System of Image Forming Apparatus and Sheet Type Identification Apparatus FIG. 2 is a block diagram illustrating a control system according to the present embodiment. More specifically, a control system of the image forming apparatus 201 and the sheet type identification apparatus 100 will be described with reference to FIG. 2.

As illustrated in FIG. 2, the image forming apparatus 201 includes a main controller 400 serving as a controller that controls the operation of the image forming apparatus 201, the operation of the sheet type identification apparatus 100 electrically connected to the image forming apparatus 201, and the like. The image forming apparatus 201 includes a memory 401 constituted by a random access memory (RAM) or the like, a sheet type database 402 constituted by a read-only memory (ROM) or the like, and the operation portion 502 that are each electrically connected to the main controller 400.

The sheet type identification apparatus 100 includes a controller 160 connected to the main controller 400 of the image forming apparatus 201 described above. The sheet type identification apparatus 100 also includes an upstream sheet sensor 104, a downstream sheet sensor 105, an optical sensor 130, an ultrasonic wave sensor 135, and a sheet thickness sensor 140 that are connected to the controller 160 and that are described below.

Necessity of Setting Sheet Type in Image Forming Apparatus

Figure 3A:
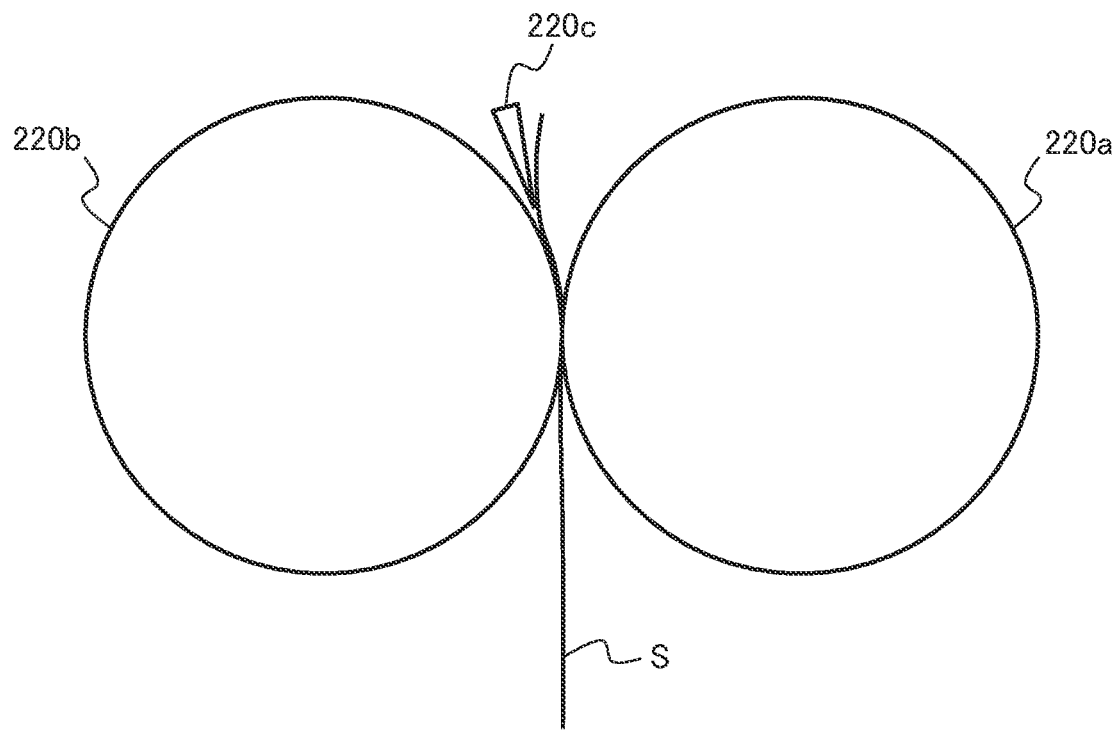
FIG. 3A is a diagram illustrating a state in which a sheet is separated from a heating roller of a fixing portion.
Figure 3B:
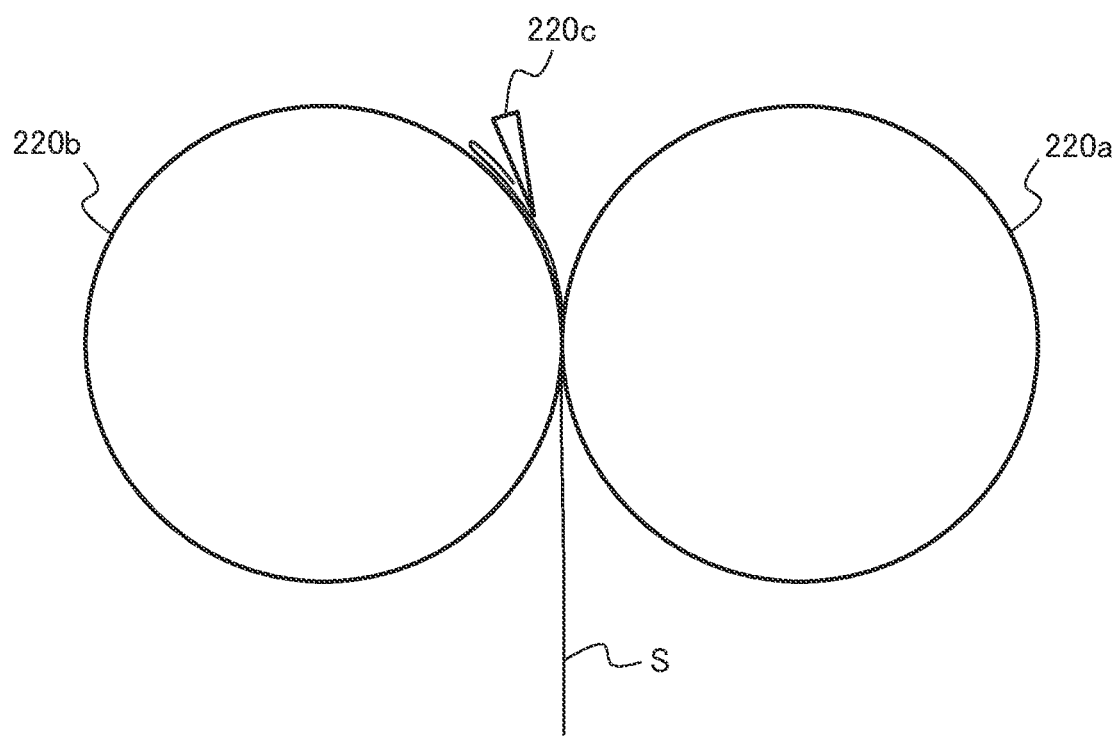
FIG. 3B is a diagram illustrating a state in which a sheet is wound around the heating roller of the fixing portion.

FIG. 3A illustrates a state where a sheet is separated from a heating roller of a fixing portion. FIG. 3B illustrates a state where the sheet is wound around the heating roller of the fixing portion. More specifically, the necessity of setting the sheet type when performing an image forming operation in the image forming apparatus 201 will be described with reference to FIGS. 3A and 3B.

Conditions of the image forming operation, that is, the conveyance speed and temperature for the fixation, the transfer voltage of the secondary transfer, and the like in printing vary depending on the type of the sheet on which an image is to be formed. Examples of the type of the sheet include physical properties such as the grammage, rigidity, surface property, material, and the like. Therefore, the type of the sheet to be used needs to be set in advance for the image forming operation.

Some sheets have restrictions to be set in the feed cassette 1, the manual feed tray 6, and the like that serve as a sheet feeding port. For example, some cardboards with high rigidity can only be fed from the manual feed tray 6 whose conveyance path has a low curvature. Coated paper sheets that have a smooth surface and a tendency of adhering to each other need to be fed one by one from the manual feed tray 6. Paper sheets formed from pulp typically have different flexural rigidity in the longitudinal direction and the lateral direction due to unevenness in the orientation direction of the pulp fiber caused by the manufacturing method. The orientation direction is referred to as a paper grain direction. Therefore, in some cases, there is a recommended direction in the longitudinal or lateral direction for setting the sheet in the feed cassette 1 or the manual feed tray 6 such that the flexural rigidity for bending in the conveyance path is low. In some cases, for a one-side coated paper sheet that is a plain paper sheet whose one surface is coated, which surface of the sheet should face upward when being set in the feed cassette 1 or the manual feed tray 6 is specified for performing printing on the coated surface.

Some types of sheets cannot be used in the image forming apparatus 201. For example, for cardboards with excessively high rigidity, the conveyance of the sheet can stop due to resistance that the sheet receives when being conveyed through a bent conveyance path. For thin paper sheets having excessively low rigidity, the sheet is strongly affected by an adhesive force between molten toner and the heating roller 220b when passing through the fixing portion 201E. In the case of a sheet such as a plain paper sheet, as illustrated in FIG. 3A, after the sheet is heated and pressurized by the heating roller 220b and the pressurizing roller 220a, the leading end of the sheet is separated from the heating roller 220b and the pressurizing roller 220a due to the rigidity thereof. Therefore, the sheet can be separated from the heating roller 220b by a separation plate 220c. In the case of a thin paper sheet having excessively low rigidity, as illustrated in FIG. 3B, after the sheet is heated and pressurized by the heating roller 220b and the pressurizing roller 220a, the leading end of the sheet does not separate from the heating roller 220b, and thus the sheet cannot be separated from the heating roller 220b by the separation plate 220c. Therefore, a malfunction in which the sheet is wound around the heating roller 220b can occur. In addition, in the case of a synthetic sheet formed from synthetic resin instead of pulp, there is a possibility that the synthetic sheet melts when subjected to high heat in the fixing portion 201E and contaminates the heating roller 220b.

As described above, to perform image formation appropriately without causing a failure in image formation by the image forming apparatus 201, it is important to identify the type of the sheet to be used before the image formation is started. Then, in the image forming apparatus 201, the conditions of the image formation need to be appropriately set, or declining acceptance of the sheet is needed depending on the type of the sheet.

Configuration of Sheet Type Identification Apparatus

Figure 4A:
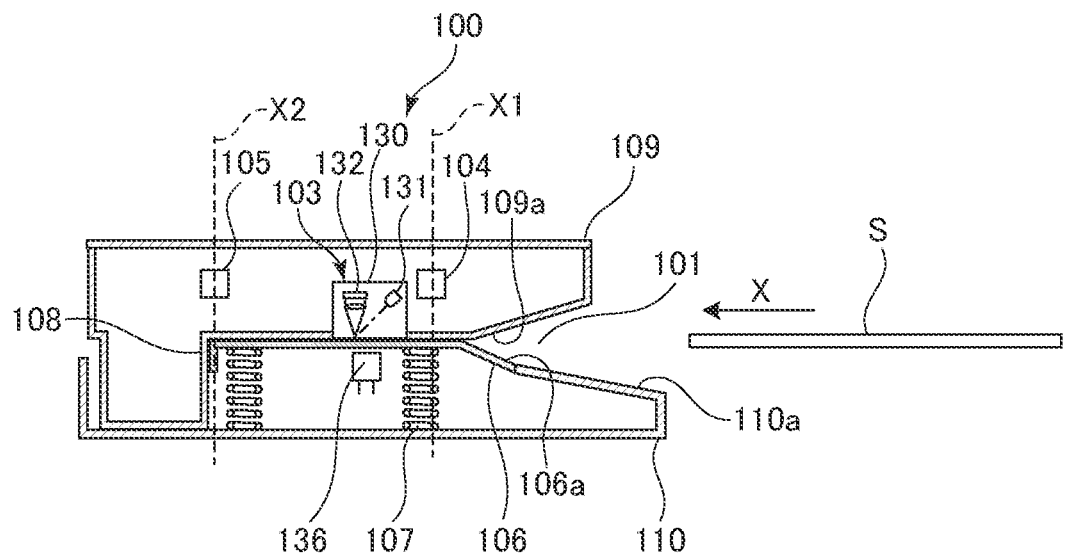
FIG. 4A is a section view of the sheet type identification apparatus in a state before the sheet according to the present embodiment is inserted.
Figure 4B:
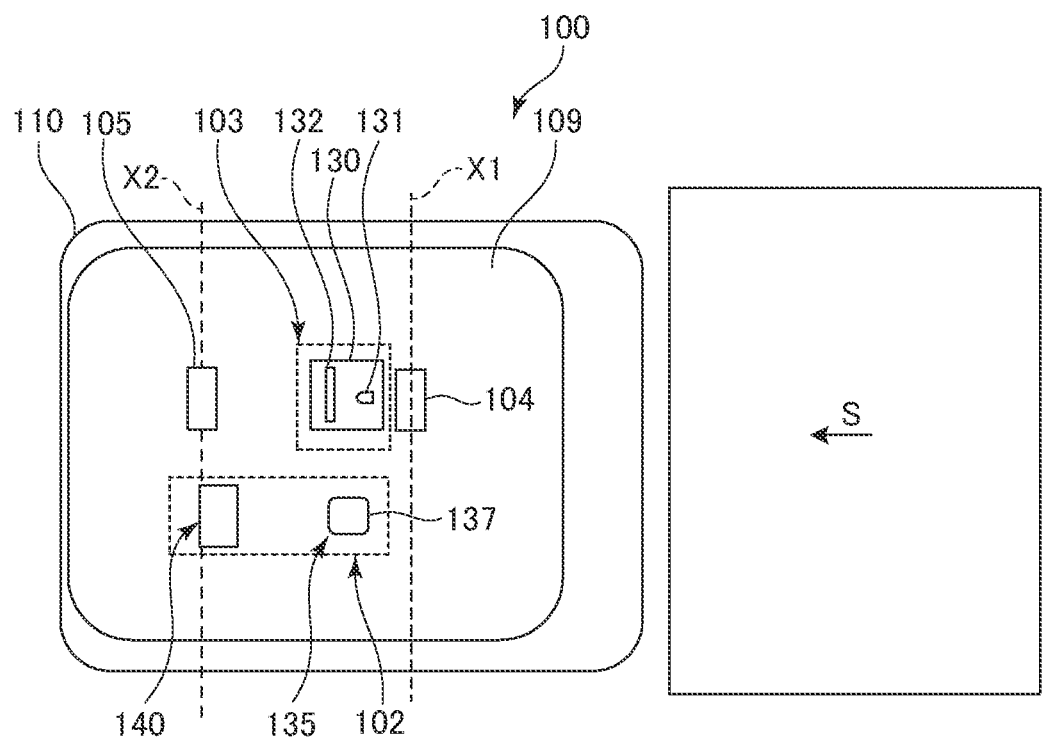
FIG. 4B is a schematic diagram illustrating the sheet type identification apparatus in the state before the sheet according to the present embodiment is inserted as viewed from above.
Figure 5A:
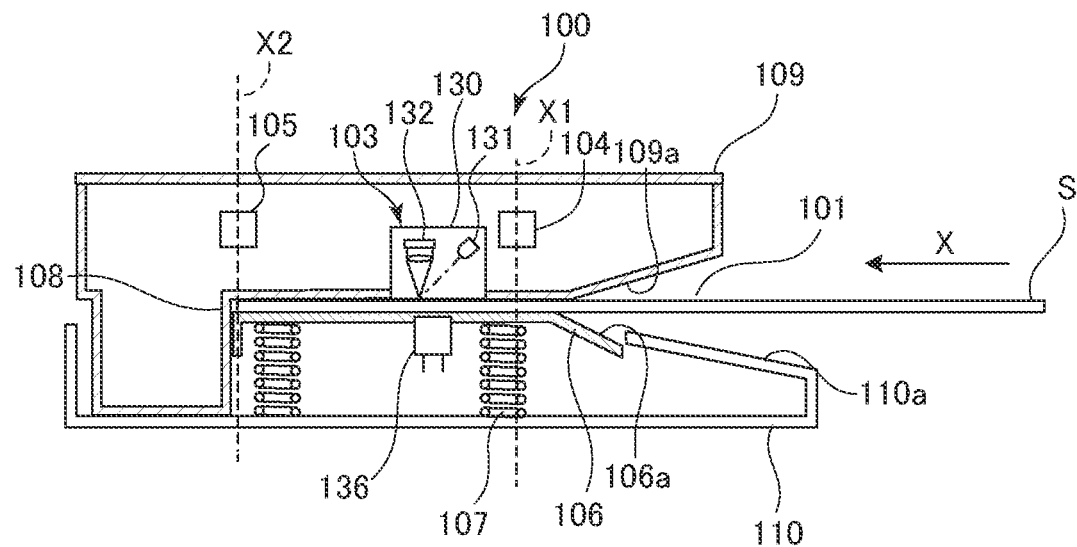
FIG. 5A is a section view of the sheet type identification apparatus in a state in which the sheet according to the present embodiment is inserted.
Figure 5B:
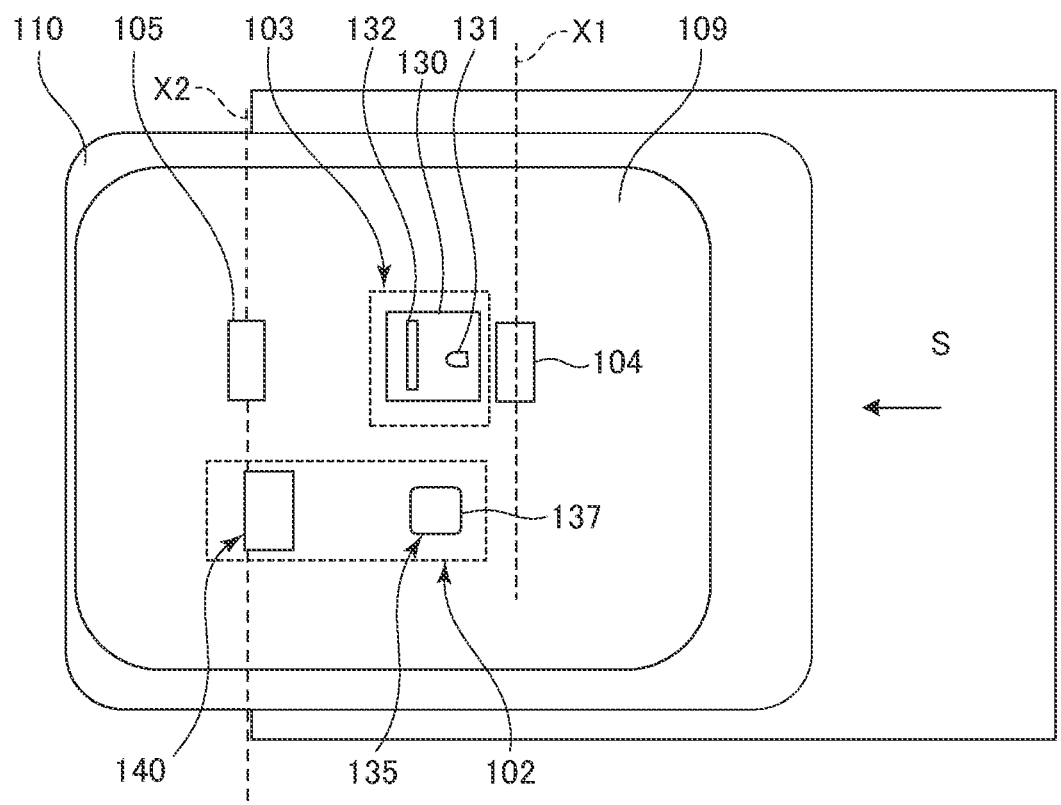
FIG. 5B is a schematic diagram illustrating the sheet type identification apparatus in the state in which the sheet according to the present embodiment is inserted as viewed from above.

The configuration of the sheet type identification apparatus 100 will be described with reference to FIGS. 4A to 6. FIG. 4A is a section view of a sheet type identification apparatus in a state before the sheet according to the present embodiment is inserted. FIG. 4B is a schematic diagram illustrating the sheet type identification apparatus in the state before the sheet according to the present embodiment is inserted as viewed from above. FIG. 5A is a section view of the sheet type identification apparatus in a state in which the sheet according to the present embodiment is inserted. FIG. 5B is a schematic diagram illustrating the sheet type identification apparatus in the state in which the sheet according to the present embodiment is inserted as viewed from above. FIG. 6 is a schematic diagram illustrating the sheet type identification apparatus in the state before the sheet according to the present embodiment is inserted as viewed in the insertion direction.

The sheet type identification apparatus 100 is provided together with the operation portion 502 on the image forming apparatus body 201A as illustrated in FIG. 1. When the user inserts the sheet S in the guide path 101, the sheet type identification apparatus 100 measures and obtains the physical properties of the sheet S. The measurement portion for the physical properties is constituted by a mechanical property measurement portion 102 and a surface property measurement portion 103, and the physical properties of the sheet S such as the grammage, the surface property, the sheet thickness, and the like can be obtained when the sheet S passes the mechanical property measurement portion 102 and the surface property measurement portion 103.

As illustrated in FIG. 4A, the sheet type identification apparatus 100 includes an upper block 109 serving as a guide member or a first guide member and a lower block 110 serving as a guide member or a second guide member. The upper block 109 includes an upper guide surface 109a. The lower block 110 includes a lower guide surface 110a and a pressing member 106 that will be described below includes a pressing surface 106a. The lower guide surface 110a and the pressing surface 106a are disposed to oppose the upper guide surface 109a, and thus the guide path 101 for guiding the inserted sheet S is defined. The upper block 109 includes an abutment portion 108 that the sheet S inserted in the guide path 101 abuts. The pressing member 106 is urged and pressed against the upper guide surface 109a or an optical sensor 130, described below, by a spring 107 serving as an urging member and provided in the lower block 110 in a contracted state.

As illustrated in FIGS. 4A, 4B, and 6, the mechanical property measurement portion 102 includes an ultrasonic wave sensor 135 serving as a grammage detection portion that measures the grammage of the inserted sheet S as illustrated in FIG. 2. The mechanical property measurement portion 102 includes a sheet thickness sensor 140 serving as a thickness detection portion that measures the thickness of the inserted sheet S as illustrated in FIG. 2. The surface property measurement portion 103 includes an optical sensor 130 that measures the surface properties such as the surface roughness, gloss, and the like as illustrated in FIG. 2.

As illustrated in FIGS. 4A and 4B, the sheet type identification apparatus 100 includes an upstream sheet sensor 104 serving as a first detection portion or a movement detection portion, and a downstream sheet sensor 105 serving as a second detection portion or a movement detection portion. The upstream sheet sensor 104 outputs a different signal for a detection result depending on the presence or absence of the sheet S in a detection position X1 upstream of the mechanical property measurement portion 102 and the surface property measurement portion 103 in the insertion direction X of the sheet S. That is, the upstream sheet sensor 104 detects the presence or absence of the sheet S. The downstream sheet sensor 105 outputs a different signal for a detection result depending on the presence or absence of the sheet S in a detection position X2 downstream of the mechanical property measurement portion 102 and the surface property measurement portion 103 in the insertion direction X of the sheet S. That is, the downstream sheet sensor 105 detects the presence or absence of the sheet S. The upstream detection position X1 is located near the entrance of the guide path 101, and the downstream detection position X2 is located near the abutment portion 108 of the guide path 101. That is, the upstream sheet sensor 104 detects insertion of the sheet S into the sheet type identification apparatus 100, and the downstream sheet sensor 105 detects abutment of the sheet S on the abutment portion 108. The upstream sheet sensor 104 and the downstream sheet sensor 105 can detect the movement of the sheet S as a result of having different detection timings for the sheet S, and thus, constitute a movement detection portion.

Grammage Measurement

The ultrasonic wave sensor 135 of the mechanical property measurement portion 102 includes an ultrasonic wave transmitter 136 disposed in the lower block 110 and an ultrasonic wave receptor 137 disposed in the upper block 109 such that the guide path 101 is interposed therebetween. The ultrasonic wave sensor 135 communicates an ultrasonic wave via the sheet S inserted in the guide path 101, and detects the grammage of the sheet S. The grammage is the mass of the sheet S per unit area, and can be expressed by [$g/m^2$].

The ultrasonic wave transmitter 136 and the ultrasonic wave receptor 137 are each constituted by a piezoelectric element that is an element that converts mechanical displacement and an electric signal into each other and an electrode terminal. In the ultrasonic wave transmitter 136, when a pulse voltage of a predetermined frequency is input to the electrode terminal, the piezoelectric element oscillates to generate an ultrasonic wave, and the ultrasonic wave is transmitted through the air. When the ultrasonic wave reaches the sheet S, the sheet S is vibrated by the ultrasonic wave. As described above, the ultrasonic wave generated by the ultrasonic wave transmitter 136 is transmitted to the ultrasonic wave receptor 137 via the sheet S. The piezoelectric element of the ultrasonic wave receptor 137 generates, in the electrode terminal, an output voltage corresponding to the amplitude of the ultrasonic wave received in accordance with the grammage. Since the output voltage of the case where the ultrasonic wave is transmitted via the sheet S is attenuated as compared with a case where the sheet S is not present between the ultrasonic wave transmitter 136 and the ultrasonic wave receptor 137, the transmittance is calculated from this ratio of attenuation. Since the transmittance of the ultrasonic wave changes based on the thickness of the sheet S, the grammage of the sheet S can be estimated by using an ultrasonic wave transmittance coefficient-sheet grammage conversion formula. This is the operation principle of detecting the grammage of the sheet S by communicating an ultrasonic wave using piezoelectric elements.

Measurement of Sheet Thickness

The sheet thickness sensor 140 of the mechanical property measurement portion 102 is a lever type sensor, and detects a value corresponding to the thickness of the sheet S by an encoder (not illustrated). The lever pivots based on the thickness of the sheet S, and the encoder detects the value corresponding to the thickness of the sheet S by rotating based on the amount of pivot in an interlocked manner with the lever. The sheet thickness sensor 140 measures the sheet thickness where the sheet S is detected by the downstream sheet sensor 105, and thus the abutment of the sheet S on the abutment portion 108 is detected. The sheet thickness sensor 140 is disposed to be positioned slightly upstream of the detection position X2 of the downstream sheet sensor 105 in the insertion direction X.

Measurement of Surface Property

The optical sensor 130 of the surface property measurement portion 103 includes a light-emitting diode (LED) 131 serving as a light source and a contact image sensor (CIS) 132 serving as a scanning portion that are disposed on the upper block 109 side as illustrated in FIGS. 4A, 4B, and 6. The optical sensor 130 measures the surface property of the sheet S by irradiating the surface of the sheet S with light from the LED 131 and receiving the light reflected based on the unevenness of the surface of the sheet S by the CIS 132 via a condenser lens (not illustrated).

In the measurement of the surface property of the optical sensor 130, since the surface of the sheet S needs to be held at the optical focusing position, the orientation of the sheet S is stabilized by the pressing member 106 urged by the spring 107 as described above. As a result, the variation in the position and orientation of the sheet S at the time of measuring the surface of the sheet S by the optical sensor 130 is reduced, and the measurement of the surface property can be stably performed. The spring 107 is set such that the inserted sheet S is set to be pressed against the optical sensor 130 by a force of approximately 100 gf.

The scanning direction at the scanning position of the CIS 132 is positioned orthogonal to the insertion direction X of the sheet S. That is, in the CIS 132, dots of image sensors are arranged in the scanning direction, and imaging can be performed at a resolution corresponding to the pitch of the dots. In the present embodiment, the image sensors are arranged at a pitch of 300 dpi. The CIS 132 can only read an image of one line in one scanning, and this is insufficient for identifying the surface property of the sheet S. In this case, the unevenness of the sheet S detected by the CIS 132 is too local, and if the surface property is determined from an image of only one line in the surface of the sheet S, deviation of the output result at each measurement position is large, and the data of one line is not appropriate for determination of the surface property. To address this, the overall tendency of the surface property of the sheet S can be determined by using a result obtained by performing one-line scanning a plurality of times in the surface of the sheet S and averaging the data of respective lines. To achieve this, the measurement can be performed while the sheet S is relatively moving with respect to the optical sensor 130. That is, dynamic measurement can be performed.

To support this dynamic measurement, in the present embodiment, the upstream sheet sensor 104 and the downstream sheet sensor 105 that detect the sheet S are respectively provided upstream and downstream of the optical sensor 130 of the surface property measurement portion 103 in the insertion direction X in the guide path 101. The relationship between the detection by the sensors and the measurement of the sheet S will be described in the description of the measurement processing by the sheet type identification apparatus 100.

The local detection of the unevenness by the CIS 132 enables determination of the characteristics of the surface property for a sheet with deep recesses, such as an embossed paper sheet. While the dynamic measurement is needed to determine the overall tendency also in this case, the identification of the embossed paper sheet is made possible by using the CIS 132, and thus the identification of the sheet can be performed more flexibly.

Measurement Processing by Sheet Type Identification Apparatus

Figure 7:
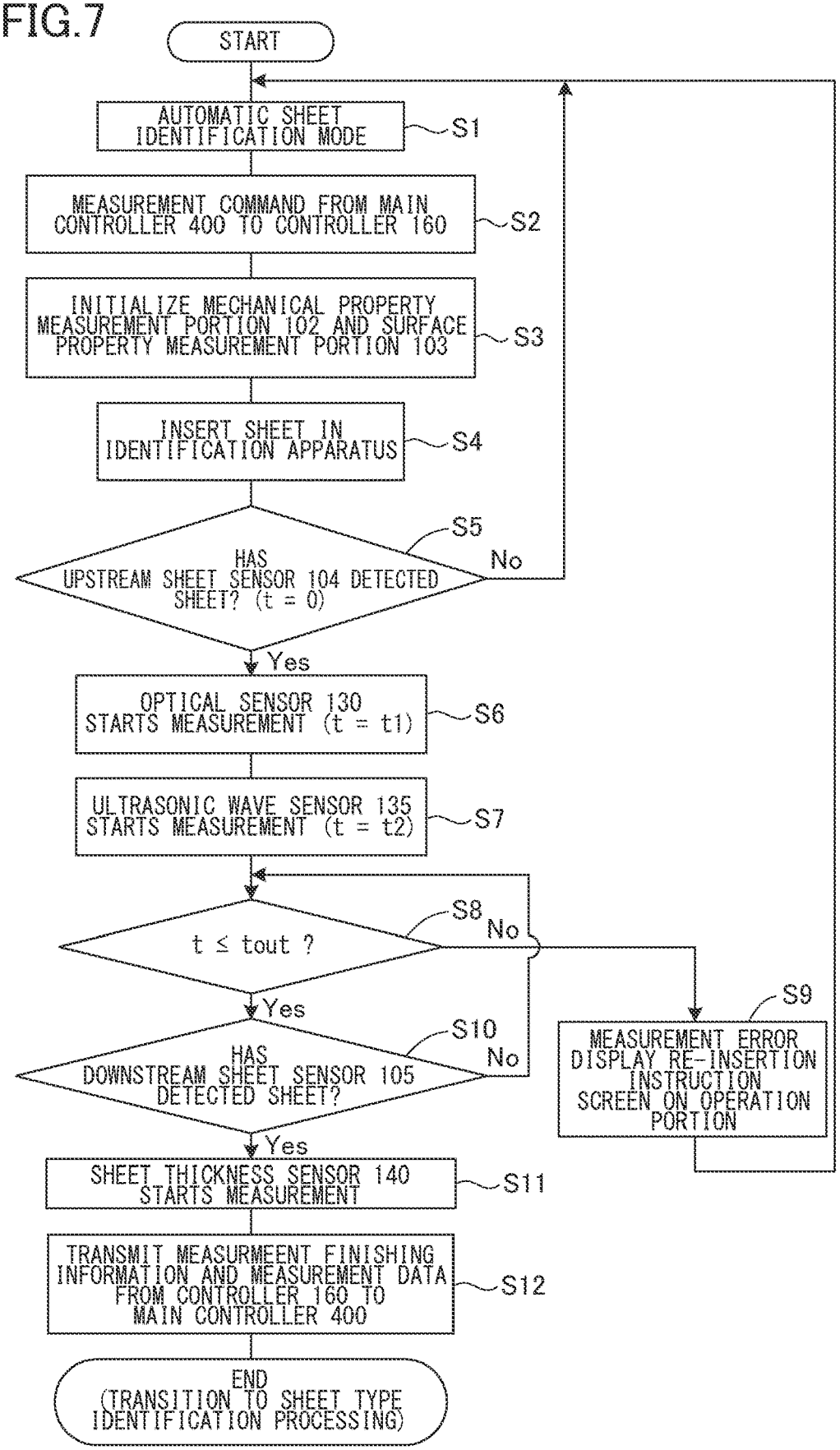
FIG. 7 is a flowchart illustrating measurement processing of the sheet type identification apparatus according to the present embodiment.
Figure 8:
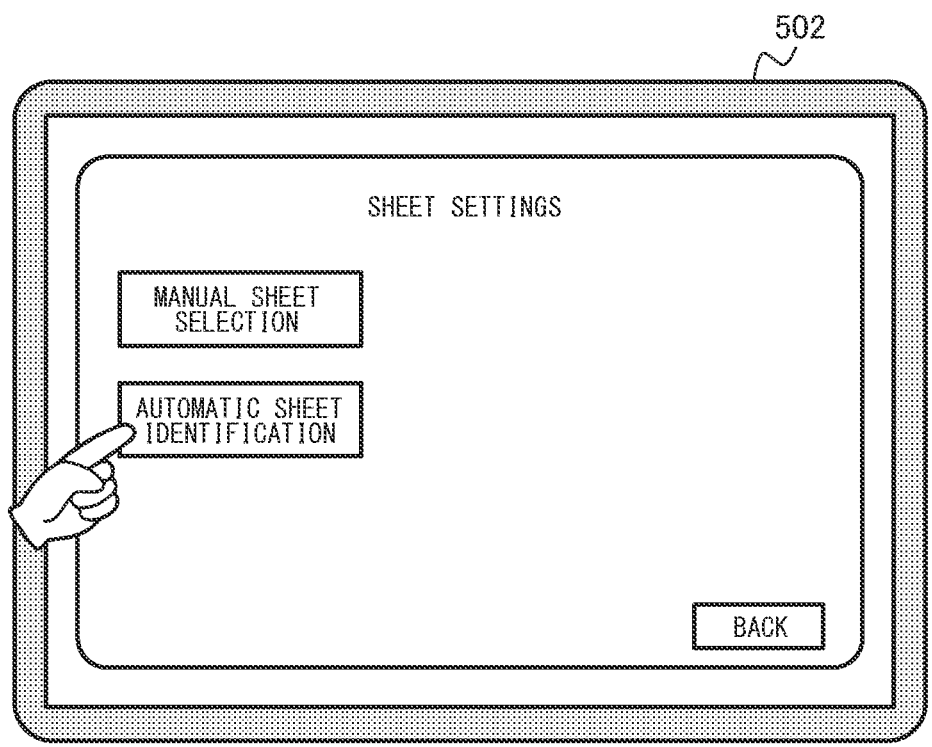
FIG. 8 is a diagram illustrating a starting screen of sheet setting according to the present embodiment.
Figure 9:
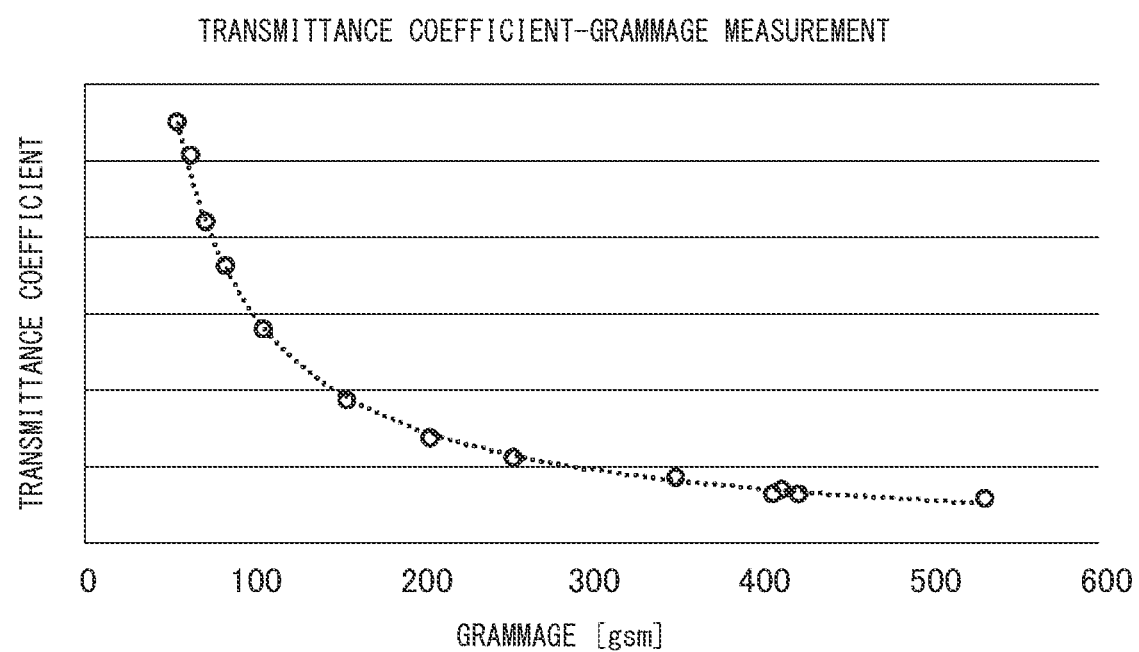
FIG. 9 is a diagram illustrating a relationship between an ultrasonic wave transmission coefficient and grammage.
Figure 10:
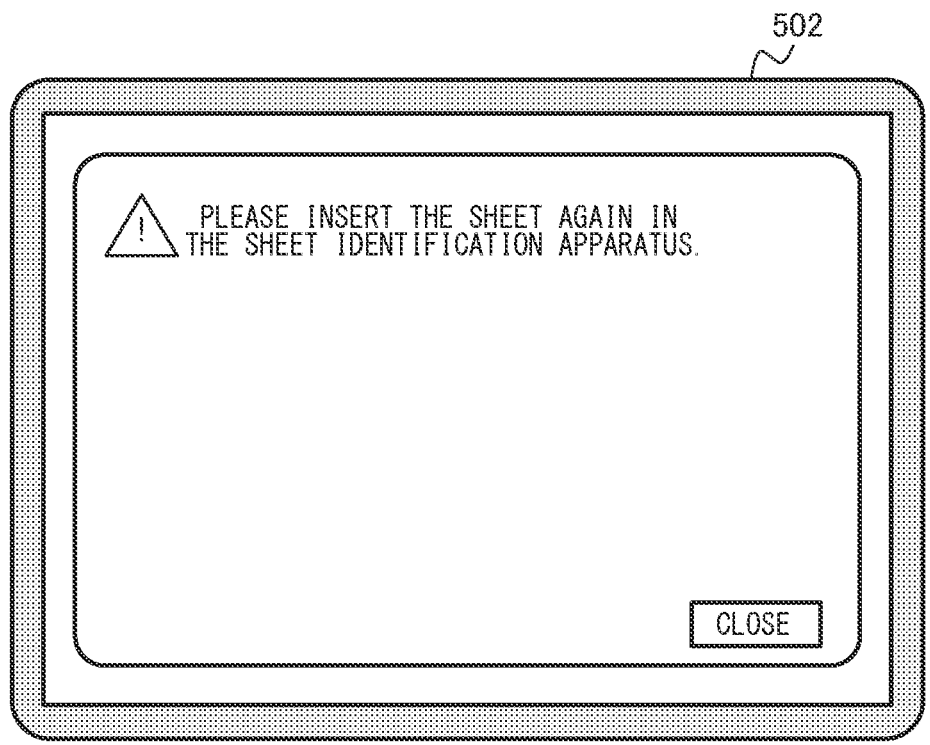
FIG. 10 is a diagram illustrating a measurement error screen according to the present embodiment.

The measurement processing executed by the controller 160 of the sheet type identification apparatus 100 will be described with reference to FIGS. 7, 8, 9, and 10. FIG. 7 is a flowchart illustrating measurement processing by the sheet type identification apparatus 100 according to the present embodiment. FIG. 8 is a diagram illustrating a starting screen of the sheet setting according to the present embodiment. FIG. 9 is a diagram illustrating a relationship between the transmission coefficient of the ultrasonic wave and the grammage. FIG. 10 is a diagram illustrating a measurement error screen according to the present embodiment.

In the case where a user uses a sheet, the main controller 400 of the image forming apparatus 201 displays a sheet selection screen illustrated in FIG. 8 on the operation portion 502. If a user selects "Automatic Sheet Identification", the main controller 400 causes the sheet type identification apparatus 100 to begin executing the processing illustrated in the flowchart of FIG. 7.

In step S1, the sheet type identification apparatus 100 transitions to an automatic identification mode. Next, in step S2, and the main controller 400 commands the controller 160 to start measurement. In step S3, the controller 160 of the sheet type identification apparatus 100 performs initialization processing of the mechanical property measurement portion 102 and the surface property measurement portion 103 to prepare for insertion of the sheet S. Next, in step S4, the user inserts the sheet S in the guide path 101 of the sheet type identification apparatus 100. In step S5 a determination is made whether the upstream sheet sensor 104 has detected the presence of a sheet. If no sheet is detected, (No), the processing returns to step S1, and the process of steps S1-S4 are repeated until the upstream sheet sensor 104 detects insertion of the sheet S. If a sheet is detected (when the upstream sheet sensor 104 detects insertion of the sheet S) (Yes), a timer t starts counting time from t=0.

After the elapse of a first predetermined time (t=t1) from the detection of sheet S by the upstream sheet sensor 104 as a trigger (t=0), in step S6, the surface of the sheet S is measured by scanning the surface of the sheet S a plurality of times by the optical sensor 130 for each predetermined cycle based on a predetermined sequence. The measurement result is processed by an ASIC of the controller 160, and the processed measurement result is accumulated in a memory in the controller 160 as surface property data. In the present embodiment, as the surface property data, information of an accumulation value of difference between adjacent pixels and information of brightness are generated and accumulated.

After the elapse of a second predetermined time (t=t2) from the detection of sheet S by the upstream sheet sensor 104 as a trigger (t=0), in step S7, the transmittance of the ultrasonic wave through the sheet S is measured by the ultrasonic wave sensor 135 based on a predetermined sequence. The controller 160 converts the transmittance into grammage information, and the grammage information is generated and accumulated in the memory in the controller 160 similarly to the surface property data. To convert the transmittance of ultrasonic wave into grammage, the grammage is determined by using an ultrasonic wave transmittance coefficient-grammage conversion formula indicated by a broken line in FIG. 9.

In step S8, the controller 160 determines whether a timeout time (t=tout) has elapsed as a set time of the timer t from the detection of the sheet S by the upstream sheet sensor 104 as a trigger (t=0). Before the timeout time of the timer t elapses, that is, when a result of step S8 is "Yes", the processing proceeds to step S10. In the case where the downstream sheet sensor 105 has detected the sheet S before the timeout time of the timer t elapses, that is, in the case where the result of step S10 is "Yes", the sheet thickness of the sheet S is measured by the sheet thickness sensor 140 in step S11. The sheet thickness information is generated and accumulated in a memory in the controller 160.

As a result of the downstream sheet sensor 105 detecting the sheet S before the timeout time, the controller 160 determines that the sheet S has moved while being measured by the optical sensor 130. That is, as a result of the scanning being performed at a plurality of different positions to which the sheet S has moved instead of the same position, data with high precision can be obtained, and it is determined that accurate data is obtained.

The controller 160 determines that all measurement has been successfully completed, and notifies the main controller 400 of the image forming apparatus 201 that the measurement has been successfully finished. Then, in step S12, the controller 160 transmits the grammage, surface property, and information of the sheet thickness serving as measurement data that has been generated and accumulated to the main controller 400. The controller 160 then finishes the measurement processing, and the main controller 400 transitions to sheet type identification processing for identifying the sheet type.

Returning to step S8, in the case where the timeout time of the timer t has elapsed before the downstream sheet sensor 105 detects the sheet S, that is, in the case where the result of step S8 is No, processing of stopping the measurement as an error is performed in step S9. That is, the controller 160 determines that accurate data of the surface property of the sheet is not obtained, discards all data accumulated in the memory in the controller 160, and transmits error information to the main controller 400 of the image forming apparatus 201. Then, the main controller 400 displays a screen prompting re-insertion of the sheet in the sheet type identification apparatus 100 for re-measurement on the operation portion 502 as illustrated in FIG. 10. After the user recognizes this instruction for re-insertion, the process returns to step S1, and the measurement processing illustrated in FIG. 7 is repeated.

As described above, in the measurement processing according to the present embodiment, the measurement by the optical sensor 130 started in response to detection of the sheet S by the upstream sheet sensor 104, and the measurement by the optical sensor 130 is completed in response to detection of the sheet S by the downstream sheet sensor 105. As a result, it can be confirmed that the scanning of the sheet S by the optical sensor 130 has been performed while the sheet S is moving. That is, it can be confirmed that the surface property of the sheet is dynamically performed, and thus the precision of the measurement of the surface property of the sheet can be improved.

In the measurement processing according to the present embodiment, the measurement is stopped as an error in the case where the sheet S is not detected by the downstream sheet sensor 105 after the sheet S is detected by the upstream sheet sensor 104 and before the timeout time elapses. This means that the insertion of the sheet S by the user has stopped halfway, and the sheet S is not inserted to abut the abutment portion 108. Since there is a possibility that the movement of the sheet S has stopped halfway, there is a possibility that the scanning of the sheet S by the optical sensor 130 is performed at the same position and the measurement is not performed successfully. Therefore, by stopping the measurement as an error, erroneous identification of the type of the sheet S can be suppressed, and by prompting the user to perform measurement again, the precision of the measurement of the surface property of the sheet can be improved.

Sheet Type Identification Processing

Figure 11:
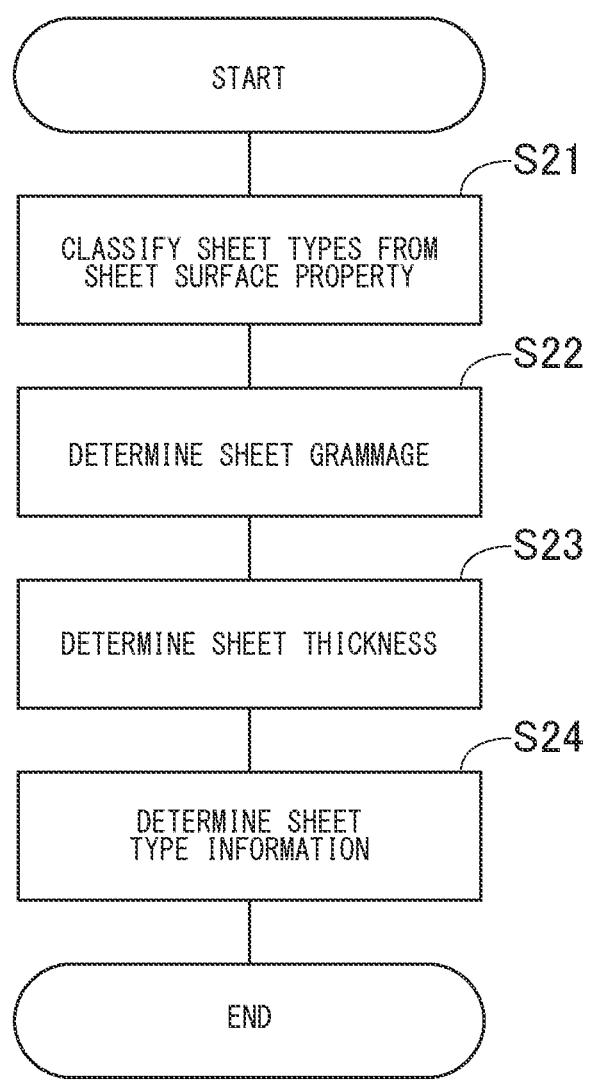
FIG. 11 is a flowchart illustrating sheet type identification processing according to the present embodiment.
Figure 12:
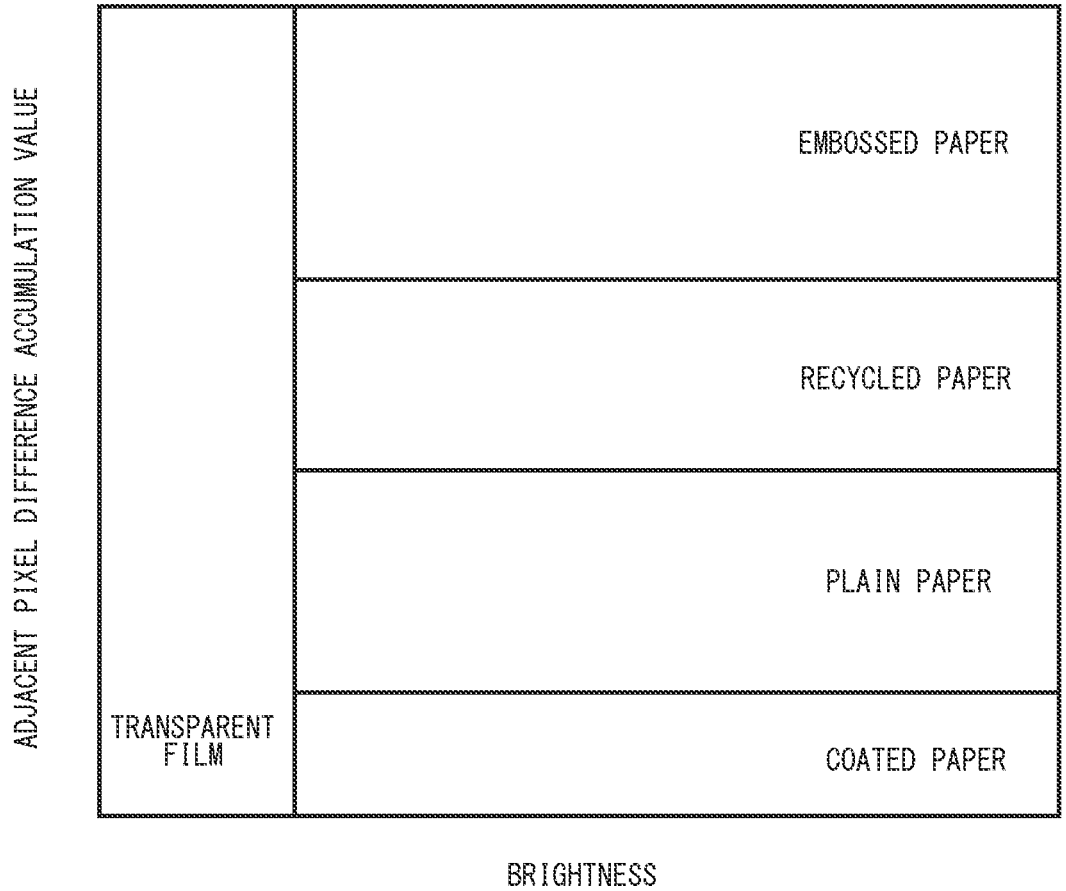
FIG. 12 is a diagram illustrating a relationship between an adjacent pixel difference accumulation value, a brightness, and a sheet type.
Figure 13:
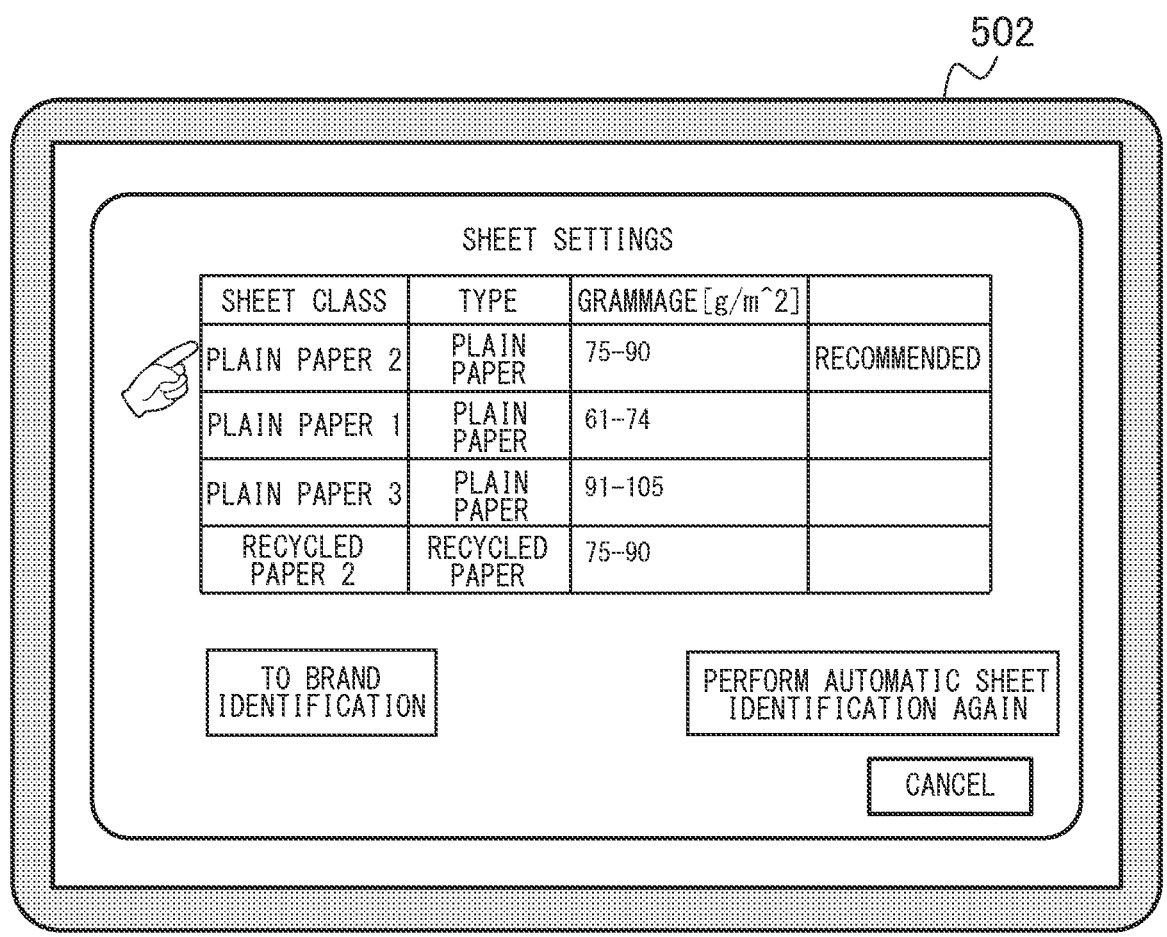
FIG. 13 is a diagram illustrating a sheet selection screen for sheet setting according to the present embodiment.
Figure 14:
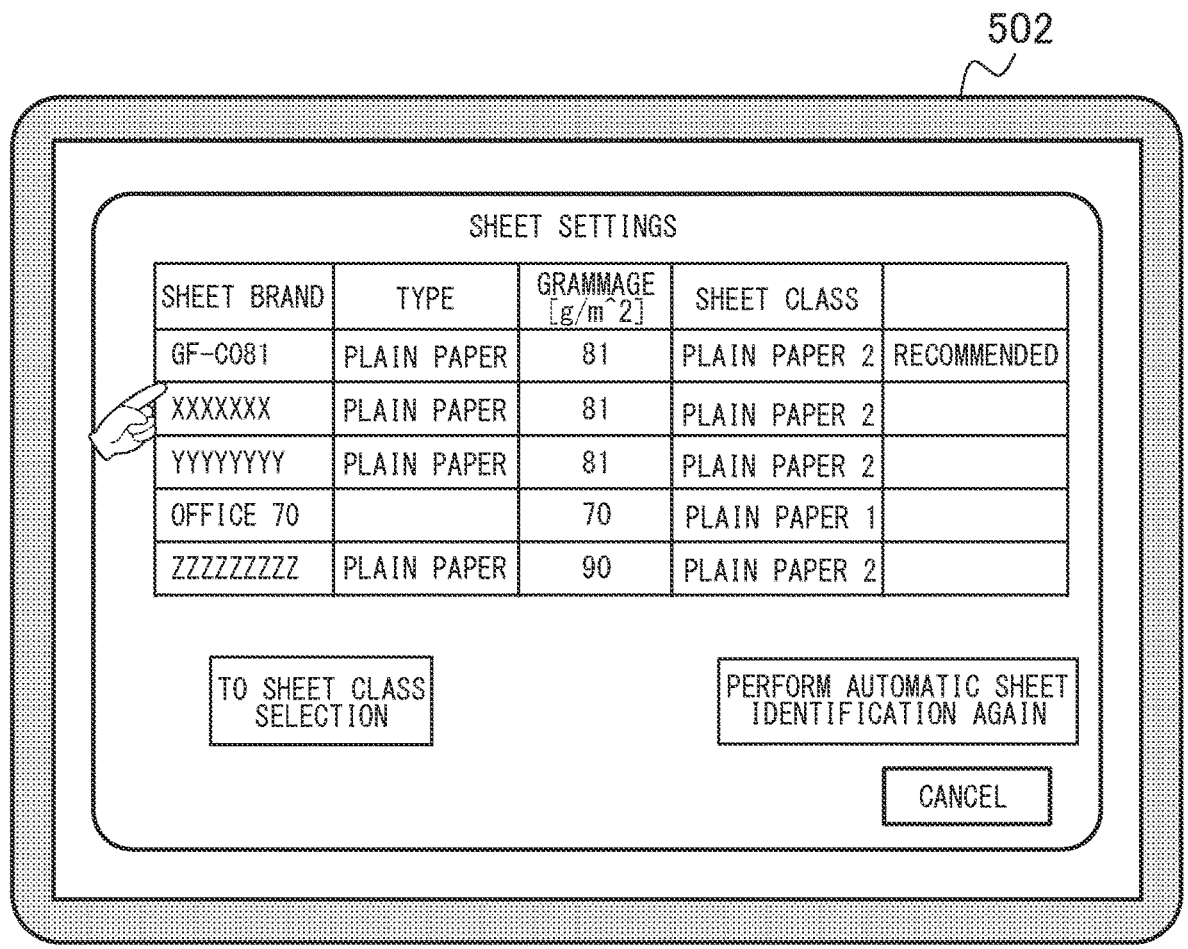
FIG. 14 is a diagram illustrating a brand determination screen in the sheet selection screen for sheet setting according to the present embodiment.

Next, sheet type identification processing executed by the main controller 400 of the image forming apparatus 201 will be described with reference to FIGS. 11 to 16. FIG. 11 is a flowchart illustrating the sheet type identification processing according to the present embodiment. FIG. 12 is a diagram illustrating a relationship between the accumulation value of difference between adjacent pixels, the brightness, and the sheet type. FIG. 13 is a diagram illustrating a sheet selection screen for sheet setting according to the present embodiment. FIG. 14 is a diagram illustrating a brand identification screen in the sheet selection screen for sheet setting. FIG. 15 is a diagram illustrating sheet type data according to the present embodiment. FIG. 16 is a diagram illustrating sheet reference data in which a relationship between sheet brands and reference values of measurement items according to the present embodiment are recorded.

As described above, in the case where it is determined by the controller 160 that accurate measurement data has been obtained and the measurement data is transmitted, the main controller 400 identifies the type of the sheet by performing sheet type identification processing.

Turning to FIG. 11, the main controller 400 classifies sheet types in step S21 based on the measurement data of the surface property. As an index of the surface property, a data table (data matrix) whose vertical axis is indicated by the adjacent pixel difference accumulation value, whose horizontal axis is indicated by the brightness, and in which classification has been performed in advance by measuring the surface properties of characteristic sheets is used as illustrated in FIG. 12. The adjacent pixel difference accumulation value is a value obtained by accumulating luminance difference between adjacent pixels in the CIS 132, and is an indicator of the unevenness of the surface of the sheet S. The brightness is an accumulation value of the luminance values of the pixels of the CIS 132 that has received light, and represents the brightness of the sheet S.

For example, a transparent film formed from resin such as polyethylene terephthalate: PET does not reflect much light from the LED 131, and thus the measured brightness thereof is low. In the case of a sheet to the surface of which geometrical recesses and protrusions are intentionally provided, such as an embossed paper sheet, the luminance difference between adjacent pixels becomes large due to the recesses and protrusions, and therefore the adjacent pixel difference accumulation value becomes large. In the case of a recycled paper sheet, the grain direction of the sheet is inconsistent, the pulp fibers are shorter as a result of undergoing the recycle process including a plurality of steps, and therefore there is a tendency that the surface property of the sheet is measured as rough. In the case of a coated paper sheet, the unevenness of the surface appears to be low due to the coating layer on the surface, and there is a tendency that the adjacent pixel difference accumulation value becomes small. In this manner, the surface properties of the sheet can be classified based on luminance information of each pixel of the CIS 132, and thus the sheet can be classified based on sheet classification used in the image forming apparatus 201. As described above, the main controller 400 determines, based on the received measurement data, which class in the data table the adjacent pixel difference accumulation value and brightness of the sheet correspond to, and classifies the sheet type based on the surface property of the sheet.

In step S22, determination is made based on the grammage of the sheet S in the received measurement data. That is, the type of the sheet is identified by adding the grammage information to the classification of the sheet made based on the surface property. For example, in the case where a sheet of GF-0081 manufactured by Canon Marketing Japan Inc., the sheet is identified by the sheet type identification apparatus 100, the sheet is identified in a category called Plain Paper 2.

In step S23, determination is made based on the sheet thickness of the sheet S in the received measurement data. That is, by using the sheet thickness information in the measurement data, the estimation precision of the grammage is improved. For example, in the case of a coated paper sheet, the surface of a medium quality paper sheet or the like is coated with a mixture of a white pigment such as clay (kaolin) or calcium carbonate and an adhesive (binder) such as starch as a paint. The coated paper sheet has a higher density than plain paper sheets for printing that include pulp as a main component, and this affects the error in the ultrasonic wave transmittance coefficient-grammage conversion formula. Therefore, the identification precision of the sheet can be improved by using the sheet thickness information together. It is effective to add the information of the sheet thickness to identify the brand of the sheet.

Sheet Selection

Next, the processing in step S24 of determining the sheet type information of the sheet S set in the image forming apparatus 201 in the present embodiment will be described. As illustrated in FIG. 13, the image forming apparatus 201 stores types of sheet settings that are selectable for each of classes set in advance. For example, the sheet GF-0081 described above is a sheet included in a sheet class of Plain Paper 2 in terms of nominal grammage, but can be classified into a different sheet class due to the variation in the grammage of the sheet itself. Therefore, a sheet class close to the class identified based on the measurement data, that is, a sheet type different from the identified sheet type is also displayed as a candidate. The sheet class identified based on the measurement by the sheet type identification apparatus 100 this time, that is, the identified sheet type is displayed as recommended. When the user performs an operation to select one of the sheet classes displayed in this manner, that is, when the main controller 400 receives the operation input, the selected sheet class is set as the type of the sheet S to be used for the image formation by the image forming apparatus 201.

In the case where the user selects "To Brand Identification" on the lower-left side of the screen illustrated in FIG. 13, the screen transitions to a brand identification screen, illustrated in FIG. 14, for selecting the brand of the sheet as an example of a sheet selection screen. The user selects the brand of the sheet while checking brands on the brand identification screen illustrated in FIG. 14, and the selected sheet brand is set as the type of the sheet S to be used for image formation by the image forming apparatus 201.

As described above, by selecting the sheet from the list of sheet classes or sheet brands, the user can perform the printing with appropriate printing settings by assigning the sheet settings (setting of sheet type) to the feed cassette 1 and the manual feed tray 6.

For example, in the case where a sheet class or sheet brand of the sheet S intended by the user is not in the sheet selection screen illustrated in FIG. 13 or FIG. 14, "Perform Automatic Sheet Identification Again" on the lower-right side of the either screen can be selected to transition to the measurement processing illustrated in FIG. 7.

The sheet type database 402 illustrated in FIG. 2 stores sheet type data in which the physical properties, parameters of optimum image formation conditions, compatibility with the image forming apparatus 201, usable feeding port (feedable port), and the like for each brand of the sheet are described, as illustrated in FIG. 15. The sheet type database 402 illustrated in FIG. 2 also stores sheet reference data in which reference values of the grammage, surface properties (adjacent pixel difference accumulation value and brightness), and sheet thickness that can be measured by the sheet type identification apparatus 100 are associated with the brand information, as illustrated in FIG. 16. The main controller 400 refers to the sheet type data and the sheet reference data, and displays several candidates having high similarity on the operation portion 502. Thus, the user can easily select the type of the sheet S and perform the sheet setting. Since the sheet class is also determined if the sheet brand is determined, by determining the sheet settings of the image forming apparatus 201 from the sheet type data of FIG. 15 and the sheet reference data of FIG. 16, the image formation (printing) can be performed at the optimum quality.

Other Embodiments

The above-described sheet type identification apparatus 100 is merely an example and the above-described configuration is not seen to be limiting. In the present embodiment, the sheet type identification apparatus 100 includes the controller 160, and information of the optical sensor 130, information of the ultrasonic wave sensor 135, and information of the sheet thickness sensor 140 are processed and transmitted to the main controller 400. In another exemplary embodiment, the measurement data obtained by each sensor can be transmitted to the main controller 400 as is, and various processing can be performed by the main controller 400. While a case where the main controller 400 determines the type of the sheet has been described, the above-described configuration is not seen to be limiting. In another exemplary embodiment, the type of the sheet can be determined by the controller 160 of the sheet type identification apparatus 100. In this case, providing, in the sheet type identification apparatus 100, the sheet type database 402 which is included in the image forming apparatus 201 in the above example can be considered.

The present embodiment described using detection of the sheet S by the upstream sheet sensor 104 as a trigger for the start of measurement. In another exemplary embodiment, the detection of the sheet S by the downstream sheet sensor 105 can be used as the trigger for the start of measurement. In this case, the measurement is performed when pulling the sheet S out from the sheet type identification apparatus 100. That is, the measurement of the surface property of the sheet by the CIS 132 is started in response to change in the detection result of one of the upstream sheet sensor 104 or the downstream sheet sensor 105. Then, the measurement can be completed in response to change in the other of the upstream sheet sensor 104 or the downstream sheet sensor 105. In addition, an activated state in which the measurement of the sheet in a standby state by the optical sensor 130 is possible can be taken by using the detection of the sheet S by the upstream sheet sensor 104 as a trigger.

The above-described description of the present embodiment was provided assuming that the measurement is treated as an error if a timeout time has elapsed from the detection of the sheet S by the upstream sheet sensor 104. In another exemplary embodiment, the measurement can be treated as an error in the case where, for example, the upstream sheet sensor 104 detects the presence of the sheet S and then the upstream sheet sensor 104 detects the absence of the sheet S without the downstream sheet sensor 105 detecting the presence of the sheet S.

The present embodiment provides an example in which various control parameters of the image forming operation by the image forming apparatus 201 are determined by selecting a sheet class or sheet brand based on the characteristics detected by the sheet type identification apparatus 100. In another exemplary embodiment, various control parameters of the image forming operation can be directly set from the feature values of the sheet measured by the sheet type identification apparatus 100.

While the present embodiment has been described with the sheet type database 402 and the main controller 400 provided in the image forming apparatus 201, in another exemplary embodiment, one or both can be provided external to the image forming apparatus 201. For example, the sheet type database 402 and the main controller 400 can be cloud based, where the latest sheet type setting information and the latest identification algorithm can be selected if the image forming apparatus 201 is connected to the cloud.

While the present embodiment has been described with the sheet type identification apparatus 100 disposed in the image forming apparatus 201, in another exemplary embodiment, the sheet type identification apparatus 100 is disposed external to the image forming apparatus 201.

The present embodiment describes a case where the lower guide surface 110a and the pressing surface 106a of the pressing member 106 are provided to oppose the upper guide surface 109a. In another exemplary embodiment, the lower guide surface 110a is removed and the pressing surface 106a of the pressing member 106 is opposed to and pressed against the entirety of the upper guide surface 109a. In another exemplary embodiment, the lower guide surface 110a of the lower block 110 is fixed, the pressing member is disposed in the upper block 109, and the pressing surface of the pressing member is pressed against the lower guide surface 110a. In this case, the optical sensor 130 is preferably disposed in the lower block 110. That is, the optical sensor 130 is disposed in either the upper block 109 or the lower block 110, and a surface is formed on one side in the thickness direction of the guide path 101. In still yet another exemplary embodiment, a surface on the other side in the thickness direction of the guide path 101 is formed in the other of the upper block 109 or the lower block 110, and an urging member that urges the surface on the other side toward the surface on the one side can be employed.

The present embodiment describes a case where the ultrasonic wave transmitter 136 is disposed in the lower block 110 and the ultrasonic wave receptor 137 is disposed in the upper block 109. In another exemplary embodiment, the ultrasonic wave transmitter 136 is disposed in the upper block 109 and the ultrasonic wave receptor 137 is disposed in the lower block 110. That is, a configuration where the ultrasonic wave transmitter 136 is disposed on one side of the guide path 101 in the thickness direction of the sheet S and the ultrasonic wave receptor 137 is disposed on the other side of the guide path 101 in the thickness direction of the sheet can be employed.

The present embodiment describes a case where the upstream sheet sensor 104 and the downstream sheet sensor 105 are used for detecting the movement of the sheet S during measurement by the optical sensor 130. In another exemplary embodiment, any element can be used as a movement detection portion that detects movement of the sheet S in the scanning position of the CIS 132. For example, a configuration in which the movement of the sheet S is detected by using a roller that is rotated by following the sheet S and an encoder that detects the rotation of the roller can be employed. In another exemplary embodiment, configuration in which the movement of the sheet S is read by an image reading apparatus or a line sensor capable of reading in the insertion direction X can be employed. In another exemplary embodiment, a configuration where, among the above-described upstream sheet sensor 104 and the downstream sheet sensor 105, the upstream sheet sensor 104 is not provided and only the downstream sheet sensor 105 is provided, and the upstream sheet sensor 104 is substituted by the CIS 132 (optical sensor 130) can be employed. That is, in this case, the movement of the inserted sheet in the scanning position of the scanning portion is detected by the downstream sheet sensor 105 serving as a movement detection portion detecting the sheet S within a set time from the detection of the sheet S by the CIS 132. In addition, the measurement is stopped as an error in the case where the set time elapses before the sheet S is detected by the downstream sheet sensor 105 after the CIS 132 has detected the sheet S.

Other Embodiments

Embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While exemplary embodiments have been described, these embodiments are not seen to be limiting. The scope of the following claims is to be accorded the broadest interpretation so as to encompass all such modifications and equivalent structures and functions.

This application claims the benefit of Japanese Patent Application No. 2022-018465, filed on Feb. 9, 2022, which is hereby incorporated by reference herein in its entirety.

What is claimed is:

1. An identification apparatus comprising:
    a guide member configured to define a guide path through which a sheet inserted therein is guided;
    a scanning portion configured to scan the sheet inserted in the guide path;
    a first detection portion disposed upstream of the scanning portion in an insertion direction of the sheet in the guide path and configured to detect presence/absence of the sheet; and
    a second detection portion disposed downstream of the scanning portion in the insertion direction in the guide path and configured to detect presence/absence of the sheet,
    wherein the identification apparatus is configured to start measurement of a surface property of the sheet by the scanning portion in response to a change in a detection result of one of the first detection portion or the second detection portion, and complete the measurement in response to a change in a detection result of whichever of the first detection portion or the second detection portion not used in determining the start of the measurement.

2. The identification apparatus according to claim 1, wherein, when the measurement is completed, information of a measurement result generated from the measurement is output.

3. The identification apparatus according to claim 1, wherein, in a case where a set time has elapsed after the measurement of the surface property is started and before the detection result of the first detection portion of the second detection portion not used in determining the start of the measurement changes, an error condition is determined and the measurement is stopped.

4. The identification apparatus according to claim 3, wherein when the measurement is stopped, information of the error is output.

5. The identification apparatus according to claim 1, wherein the measurement is started in response to detection of the sheet by the first detection portion and the measurement is completed in response to detection of the sheet by the second detection portion.

6. The identification apparatus according to claim 5, further comprising:
a grammage detection portion configured to detect a grammage of the sheet inserted in the guide path,
wherein detection by the grammage detection portion is started in response to detection of the sheet by the first detection portion.

7. The identification apparatus according to claim 6, wherein the grammage detection portion includes an ultrasonic wave transmitter disposed on one side of the guide path in a thickness direction of the sheet and an ultrasonic wave receptor disposed on a second side of the guide path in the thickness direction of the sheet.

8. The identification apparatus according to claim 5, further comprising:
a thickness detection portion configured to detect a thickness of the sheet inserted in the guide path,
wherein detection by the thickness detection portion is started in response to detection of the sheet by the second detection portion.

9. The identification apparatus according to claim 1, wherein the guide member includes an abutment portion on a downstream side of the insertion direction that the sheet abuts, and
the second detection portion is disposed to detect presence/absence of the sheet abutting the abutment portion.

10. The identification apparatus according to claim 1, wherein the scanning portion includes a light source, and a contact image sensor configured to scan a surface of the sheet irradiated by the light source.

11. The identification apparatus according to claim 1, wherein the guide member includes
a first guide member on which the scanning portion is disposed and configured to constitute one surface of the guide path in a thickness direction of the sheet,
a second guide member disposed to oppose the first guide member and configured to constitute a second surface of the guide path in the thickness direction, and
an urging member configured to urge the second guide member toward the first guide member.

12. An identification apparatus comprising:
a guide member configured to define a guide path through which a sheet inserted therein is guided;
a scanning portion configured to scan the sheet inserted in the guide path; and
a movement detection portion configured to detect movement of the inserted sheet,
wherein the identification apparatus completes measurement of a surface property of the sheet by the scanning portion in response to detection of the movement of the inserted sheet at a scanning position of the scanning portion.

13. An image forming apparatus comprising:
the identification apparatus according to claim 1;
a sheet supporting portion configured to support the sheet having undergone surface property measurement by the identification apparatus; and
an image forming portion configured to form an image on the sheet supported by the sheet supporting portion.

14. The image forming apparatus according to claim 13, further comprising a controller configured to identify a type of the sheet based on information of a measurement result generated by the surface property measurement.

15. The image forming apparatus according to claim 14, further comprising:
an operation display portion configured to display an image and receive an operation input,
wherein the controller controls the operation display portion to display a screen to prompt to perform the surface property measurement by the identification apparatus in response to input of error information from the identification apparatus.

16. The image forming apparatus according to claim 15, wherein, in response to identification of the type of the sheet based on the information of the measurement result, the controller controls the operation display portion to display the identified type of the sheet and a type of the sheet different from the identified type of the sheet as candidates, and receives input of an operation of selecting a type of sheet from the displayed candidates.

17. The image forming apparatus according to claim 13, wherein the identification apparatus is provided in an upper portion of the image forming apparatus.

* * * * *